United States Patent
Fan et al.

(10) Patent No.: US 6,622,055 B2
(45) Date of Patent: Sep. 16, 2003

(54) METHOD OF CONTROL MANAGEMENT OF PRODUCTION LINE

(75) Inventors: Yang-Ping Fan, Taipei (TW); Leon Tsai, Hsinchu Hsien (TW)

(73) Assignee: United Microelectronics Corp., Hsinchu (TW)

( * ) Notice: Subject to any disclaimer, the term of this patent is extended or adjusted under 35 U.S.C. 154(b) by 142 days.

(21) Appl. No.: 09/761,325

(22) Filed: Jan. 16, 2001

(65) Prior Publication Data

US 2002/0094588 A1 Jul. 18, 2002

(51) Int. Cl.$^7$ ............................................. G06F 19/00
(52) U.S. Cl. .......................... 700/99; 700/108; 700/121
(58) Field of Search ............................. 700/97, 99, 106, 700/108, 111, 121

(56) References Cited

U.S. PATENT DOCUMENTS

| | | | |
|---|---|---|---|
| 5,544,350 A | * | 8/1996 | Hung et al. .................. 716/19 |
| 5,880,960 A | * | 3/1999 | Lin et al. ..................... 700/99 |
| 5,889,673 A | * | 3/1999 | Pan et al. ..................... 700/97 |
| 6,263,253 B1 | * | 7/2001 | Yang et al. .................. 700/99 |
| 6,353,769 B1 | * | 3/2002 | Lin ............................. 700/101 |
| 2002/0026257 A1 | * | 2/2002 | Newmark .................. 700/108 |
| 2002/0052667 A1 | * | 5/2002 | Martin et al. ............... 700/111 |

\* cited by examiner

*Primary Examiner*—Leo Picard
*Assistant Examiner*—Elliott L Frank
(74) *Attorney, Agent, or Firm*—J.C. Patents

(57) ABSTRACT

A method of control and management of production line. More than one performance indices are used to remind production management department to adjust process throughput and labor resources to avoid the occurrence of bottleneck machine. A performance index of equipment Ieq and a performance index of work in process Iwip are calculated to several parameters. When Ieq is larger than 1.0, the number of available machines is enough to reach the target. When Ieq is smaller than 1.0, it indicated the available machines are not enough, so that whether accelerating on-line speed is required or not has to be decided. Regarding Iwip, when Iwip is larger than 1.0, the target can be reached. On the contrary, if Iwip is smaller than 1.0, the target cannot be reached. The throughput has to be enhanced to reach the target.

8 Claims, 2 Drawing Sheets

METHOD OF CONTROL MANAGEMENT OF PRODUCTION LINE

BACKGROUND OF THE INVENTION

1. Field of the Invention

The invention relates in general to a method of control management of production lines. More particularly, this invention relates to the use of a performance index to control and manage the production line.

2. Description of the Related Art

In semiconductor manufacture, to correctly estimate tile predetermined sales and operation target of wafer output, the control and management of production line is crucial. In the conventional operation and management of the production line, ill management is often seen to cause backlog, out of stock, or a long production cycle.

To fabricate a certain circuitry on a semiconductor wafer, tedious processes including material deposition, photolithography, ion implantation and thermal annealing required. Each of the above process has to be accurately performed to effectively produce the circuitry with required functions. Each process is correlated with another in operation time and throughput to avoid the total efficiency to be degraded due to a certain bottleneck. Therefore, each of the processes is monitored and whichever error is detected, so that the total processes can be adjusted in time for accuracy and, efficiency issues.

Effectively controlling and managing the production line is important for effectively managing each process machine, so as to avoid a single machine failure to cause lack of resources in the subsequent process or long on stock in the previous process. In addition, when a machine failure occurs, effective management and control of production can precisely indicate the effect upon the production line and accurately estimate whether it is required to speed up the on-line state of the machine. The equipment department can thus adjust the maintenance labor resources to reduce impact of machine failure.

SUMMARY OF THE INVENTION

The invention provides a method of control and management of a production line. A performance index is used to remind the production management department as a reference to avoid the occurrence of a bottleneck machine. The process throughput can thus be improved and the labor resource can be well adjusted, and the effect upon the date of product delivery can be predetermined.

In one embodiment of the invention, two kinds of performance indices are used to estimate the performance of production line. That is, the index of equipment (Ieq) and the performance index of work in progress (Iwip).

The index of equipment is used to indicate a ratio of the number of the current available machines to the target number of required machines. If the index of equipment is larger than 1.0, it indicates the number of machines can meet the requirement to achieve the predetermined throughput. On the contrary, if the index of equipment is smaller than 1.0, the available machines are not enough to achieve the predetermined throughput. Whether it is necessary to accelerate the on-line speed of the machines has to be determined.

The index of work in progress indicates a ratio of the number of semi-manufactured wafers to be finished within the remaining working hours today to a number of wafers predetermined to be manufactured today. If the index of work in progress is larger than 1.0, the target of today can be achieved. On the contrary, if the index of work in progress is smaller than 1.0, the target of today cannot be achieved. The index of work in progress can be used to estimate whether the current throughput is enough to prevent status of bottleneck machines to happen. Whether the throughput of the machine should be enhanced to speed up the process can also be evaluated.

Both the foregoing general description and the following detailed description are exemplary and explanatory only and are not restrictive of the invention, as claimed.

DESCRIPTION OF THE PREFERRED EMBODIMENTS

Generally speaking, the process control of a production line is manually done by a production management department in semiconductor manufacture. According to the available equipment and labor resources, it is possible for the production management department to estimate whether the work load of each process flow is balanced. The throughput can also be predicted to efficiently reach the maximum throughput. A well control and management can prevent backlog for certain process, or even prevent the bad connection between proceeding processes.

Two indices of performance are provided to evaluate the performance of a production line in manufacture:

1. The index of equipment $I_{eq}$ representing a ratio of number of the currently available machine to the number of required machines:

$$I_{eq} = PUs/[(\text{Target} - \text{Move})/(UPH * HRs)]$$

wherein, PUs is the number of the currently available machines. Target is the number of semi-manufactured wafers to be completed. Move is the number of accumulated semi-manufactured wafers. UPH is the throughput of each machine per hour. HRs is the remaining working hours today. (Target−Move) means the number of semi-manufactured wafers still needed to be finished for reaching the target. (UPH*HRs) is the number of semi-manufactured wafers that can be finished on each machine in the remaining working hours.

Figure 1:
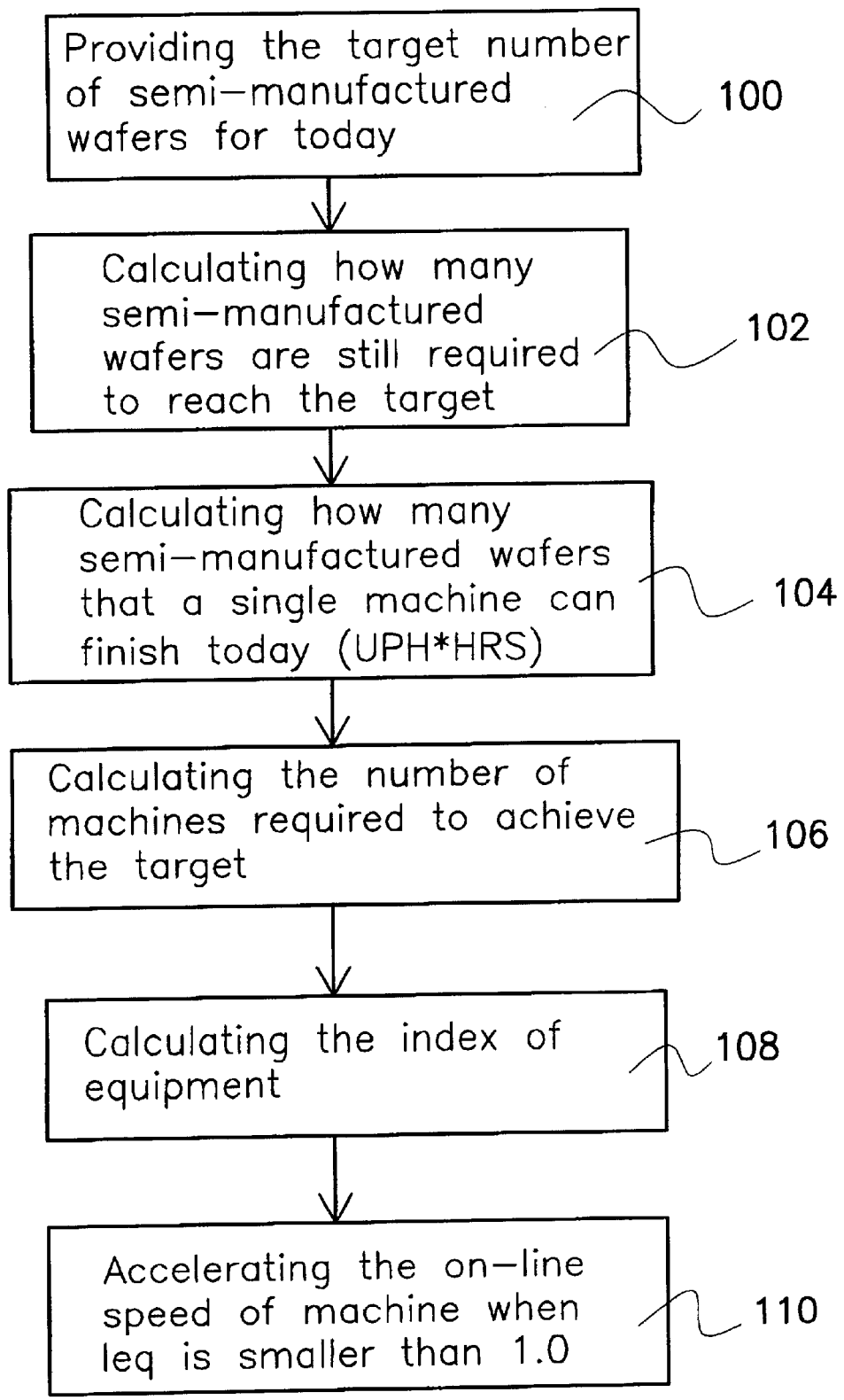
FIG. 1 shows a process flow of the control and management of a production line according to an embodiment of the invention.

Referring to FIG. 1, a process flow of control and management of production line is illustrated. As shown in step 100, the target number of semi-manufactured wafers is provided. According to the monthly target of throughput for the semi-manufactured wafers, the required target number of semi-manufactured wafers for today can be estimated based on the required steps and processing time for each process.

In Step 102, according to the on-line information report, the number or semi-manufactured wafers that have been finished so far today is calculated. The calculation method includes deducting the number of accumulated semi-manufactured wafers from the target number of semi-manufactured wafers of today, that is, (Target−Move).

In Step 104, the throughput of each machine is multiplied by a remaining working time of today to obtain the number of semi-manufactured wafers that each machine can produce, that is, (UPH*HRs). The throughput of each machine per hour can also be calculated according to the accumulated semi-manufactured wafers (Move).

In step 106, the required number of semi-manufactured wafers to be finished within the remaining working hours to reach the target (Target−Move) is calculated and divided by the number of the semi-manufactured wafers that a machine can produce to obtain a ratio. The required number of machines to achieve the target throughput can thus be determined.

As shown in Step 108, a ratio of the number required to achieve the target to the number of available machines is calculated, the performance index of equipment is obtained.

If the performance index of equipment is larger than 1.0, the available machines are enough to achieve the required throughput. If the performance index of equipment is smaller than 1.0, as shown in Step 110, one has to speed up the on-line status for the machines. Therefore, the index of equipment provides an exact index to the equipment department to determine whether it has to accelerate the on-line speed for equipment to reduce the impact upon the production line.

2. The index of work in progress Iwip that indicates a ratio of number of semi-manufactured wafers to be finished within the remaining working hours today to a target number of semi-manufactured wafers to be finished within today:

$$Iwip=[(WIP+FlowIn)/(Target-Move)]$$

Wherein WIP is the number of semi-manufactured wafers for a machine currently; and FlowIn is the number of semi-manufactured wafers to be finished by the machine for today. (WIP+FlowIn) represents the number of semi-manufactured wafers to be finished by the machine in the remaining hours of today. (Target−Move) is the required number of semi-manufactured wafers to be finished by today in order to reach the target for today.

Figure 2:
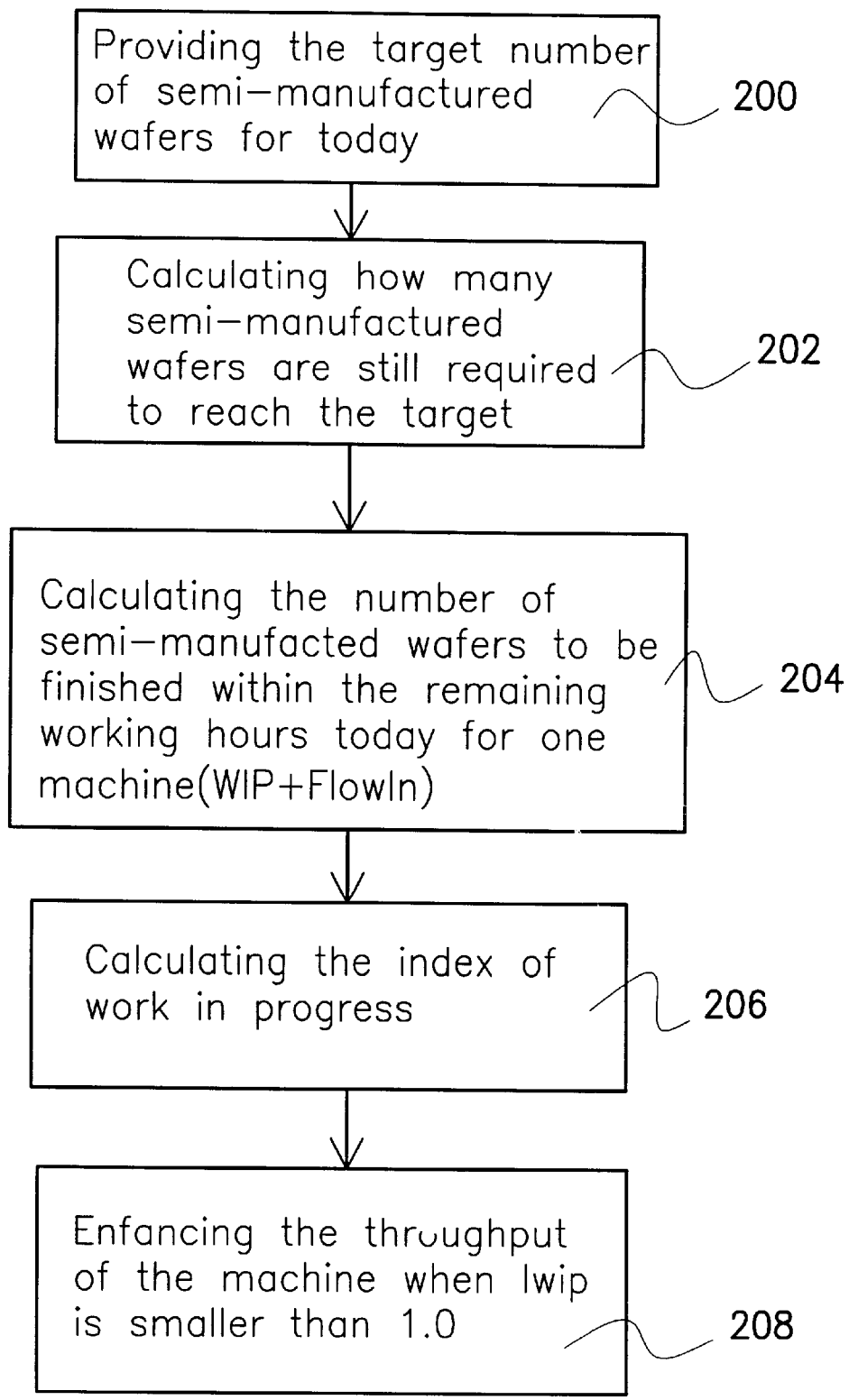
FIG. 2 shows another embodiment of the control and management of a production line according to the invention.

FIG. 2 illustrates flow chart of a method of control and management of a production line. The steps 200 and 202 are similar to the steps of 100 and 102. That is, the target number of semi-manufactured wafers to be finished is provided. The number of semi-manufactured wafers that have finished today up to current is calculated. The calculation method includes deducting the target number of semi-manufactured wafers of today by the number of accumulated semi-manufactured wafers, that is, (Target−Move). In Step 204, according to the on-line information report, the number of the semi-manufactured wafers in one machine up to current (WIP) is added with the number of semi-manufactured wafers to be finished by the machine today (FlowIn). That is, the number of semi-manufactured wafers to be finished by the machine within the remaining working hours today is calculated as (WIP+FlowIn). The number of the semi-manufacture wafers to be finished by the machine can be estimated according to the throughput of one machine per hour.

In Step 206, a ratio of the number of semi-manufactured wafers to be finished by the machine within the remaining working hours today to the number of semi-manufactured wafers required to reach the target is calculated to obtain the index of work in progress Iwip.

If the index of work in progress is larger than 1, the target of today can be achieved. If the index of work in progress "Iwip" is smaller than 1, as shown in FIG. 208, the target can not be met. The index of work in progress can be used to determine whether the current throughput is enough. When the production management department discover that the current throughput cannot make the target, increasing the throughput of the machine is considered.

According to the above embodiment, the index of equipment Ieq is used to evaluate whether the available machines are enough. When a machine is dumb, a precise instruction is given to the equipment department to determine whether it is necessary to speed up the on-line status of the machine to reduce the impact on the production line.

Regarding index of work in progress, whether the throughput is enough to prevent bottleneck machine can be determined. Together with the index of equipment, whether the products can be delivered on time can be predetermined and controlled. If the production management department presumes that the throughput cannot reach the target according to the index of work in progress, the throughput of machine is considered to be enhanced, or the processing flow is considered to be accelerated.

In addition, the above method can be implemented by plugging a computer with the calculation functions into the production line. The above data such as the current available machines PUs, the remaining working hours HRs, the target number of the semi-manufactured wafers to be produced within today, Target, the number of semi-manufactured wafers that have been produced so far today, Move, can be input to a database of the computer. A real time control can thus be achieved to effectively manage the whole production line, and the index of equipment can be obtained from the computer aided system. Similarly, inputting Target, Move, the number of semi-manufactured wafers that one machine produce WIP and the number of semi-manufactured wafers that a machine needs to produce in the remaining working hours today can be input to the database. As a result, the performance index of work in process can be estimated.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of control and management of a production line, the method comprising:

providing a target of a number of semi-manufactured wafers to be finished for today (Target);

calculating a number of semi-manufactured wafers still required so far today by deducting a number of semi-manufactured wafers that have been produced so far today (Move) from the target of the number of semi-manufactured wafers (Target), that is, calculating a result of (Target−Move);

calculating a number of semi-manufactured wafers that a machine can still produce for today (UPH*HRs), wherein UPH is a throughput of one machine, and HRs is remaining working hours for today;

calculating a number of required machines to achieve the target of the number of semi-manufactured wafers today by [(Target−Move)/(UPH*HRs)];

calculating an index of equipment Ieq by dividing a number of available machines current (PUs) with a number of machines required to achieve a target throughput, that is, $$Ieq=PUs/[(Target-Move)/(UPH*HRs)],\ and$$

accelerating an on-line speed of the machines when the index of equipment is less than 1.0.

2. The method according to claim 1, wherein a step of calculating a throughput of the machine per hour is calculated according to the number of the semi-manufactured wafers which have been produced so far today (Move).

3. A method of control and management of production line, the method comprising:

providing a target of a number of semi-manufactured wafers to be finished for today (Target);

calculating a number of semi-manufactured wafers still required so far today by deducting a number of semi-manufactured wafers that has been produced so far today (Move) from the target of the number of semi-manufactured wafers (Target), that is, calculating a result of (Target−Move);

calculating a number of semi-manufactured wafers to be finished within the remaining working hours today, that is, summing up a number of semi-manufactured wafers for one machine (WIP) and a number of semi-manufactured wafers to be finished for the machine today (Flowin);

Calculating an index of work in progress (Iwip) by dividing the number of semi-manufactured wafers to be finished within the remaining working hours today (WIP+FlowIn) with a number of semi-manufactured wafers required so far to reach the target number of the semi-manufactured wafers for today (Target-Move), that is, $$Iwip=[(WIP+FlowIn)/(Target-Move)], and$$

increasing a throughput of the machine when the index of work in progress is less than 1.0.

4. The method according to claim 3, wherein the number of semi-manufactured wafers to be produced by the machine in the remaining working hours today is obtained by estimating a throughput of the machine per hour.

5. A method of control and management of production line using a computer aided to calculate the performance index, a computer with calculation functions is plugged to the production line control system, the method comprising:

inputting a target number of semi-manufactured wafers of today (Target) into a database of the computer;

inputting a number of semi-manufactured wafers that have been produced so far today (Move) from the production line to the database;

inputting a number of available machines currently (PUs) from the production line to the database;

calculating a performance index of equipment (Ieq) according to the following equation by the computer:

$$Ieq=PUs/[(Target-Move)/(UPH*HRs)]$$

wherein UPH is a throughput of one machine per hour; HRs is the remaining working hours for today; Target−Move is a number of semi-manufactured wafers required to achieve the target number of semi-manufactured wafers for today (Target); and UPH*HRS indicates how many semi-manufactured wafers to be finished by today by one machine; and accelerating an on-line speed of machines being reminded by the computer when the index of equipment is smaller than 1.0.

6. The method according to claim 5, wherein the throughput of one machine per hour is calculated according to the number of semi-manufactured wafers that have been produced so far today (Move).

7. A method of control and management of production line using a computer aided to calculate the performance index, a computer with calculation functions is plugged to the production line control system, the method comprising:

inputting a target number of semi-manufactured wafers of today (Target) into a database of the computer;

inputting a number of semi-manufactured wafers that have been produced so far today (Move) from the production line to the database;

inputting a number of semi-manufactured wafers of one machine (WIP) so far to the database;

calculating a performance index of work in process (Iwip) according to the following equation by the computer:

$$Iwip[(WIP+FlowIn)/(Target-Move)]$$

wherein FlowIn is a number of semi-manufactured wafers to be finished in the remaining working hours of today; and accelerating a throughput of machines for being reminded by the computer when the index of work in process is smaller than 1.0.

8. The method according to claim 7, wherein the number of semi-manufactured wafers to be finished in the remaining working hours of today (FlowIn) is estimated according to the throughput of one machine per hour.

* * * * *